Jan. 18, 1966   R. C. BURNS ETAL   3,230,382
D.C.-A.C.-D.C. VOLTAGE CONVERTER
Filed Dec. 22, 1961

INVENTORS
ROBERT C. BURNS
EARL D. CRAWFIS
HERBERT HECHT
BY
ATTORNEY

United States Patent Office 3,230,382
Patented Jan. 18, 1966

3,230,382
D.C.-A.C.-D.C. VOLTAGE CONVERTER
Robert C. Burns and Earl D. Crawfis, Phoenix, and Herbert Hecht, Scottsdale, Ariz., assignors to Sperry Rand Corporation, Great Neck, N.Y., a corporation of Delaware
Filed Dec. 22, 1961, Ser. No. 161,611
6 Claims. (Cl. 307—11)

This invention relates to a voltage converter, and more specifically to a converter for increasing the line voltage associated with direct current energy.

Since conventional electromagnetic transformers are not operable with non-varying direct currents, some artifice must be employed when the voltage level of steady direct current energy is to be raised or lowered.

In one form of prior art solution to this problem, the direct voltage is converted to an alternating voltage, transformed to a higher value, and re-converted to a direct voltage at the desired level. Devices operating on this principle are expensive and cumbersome in that all of the power must pass through the various components. Furthermore, it is often desired to extract both alternating and direct voltages from the same voltage converter. Under these conditions, the magnitude of the alternating voltage is influenced to a considerable degree by the nature of the load connected to the direct voltage terminals.

It is an object of the present invention to provide an improved voltage converter that employs relatively low power components.

It is another object of the invention to provide a voltage converter in which the voltage output is relatively independent of the load placed on the converter.

According to the principles of the present invention, a portion of the power to be delivered to the load is converted from unvarying to pulsating power and then passed through an isolating and rectifying means. This portion of the power is then added to a second portion of power derived directly from the input line.

Figure 1:
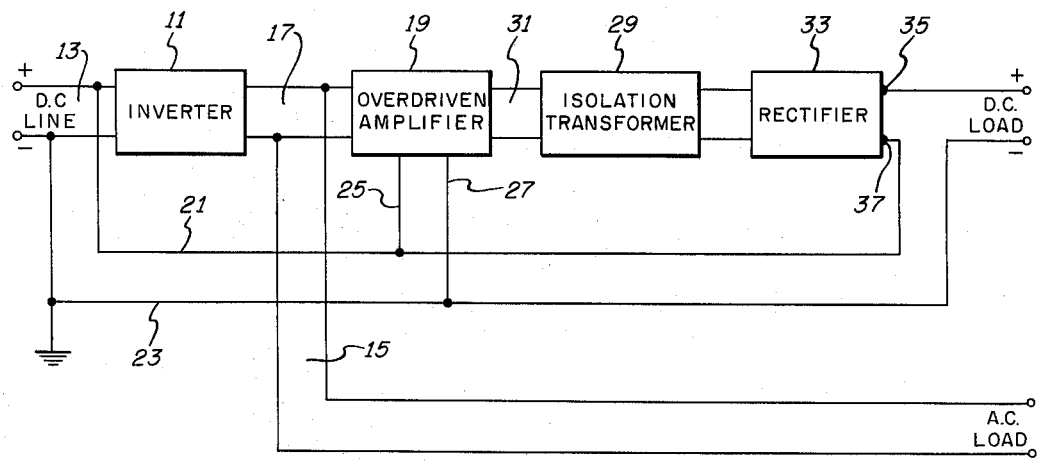
Figure 2:
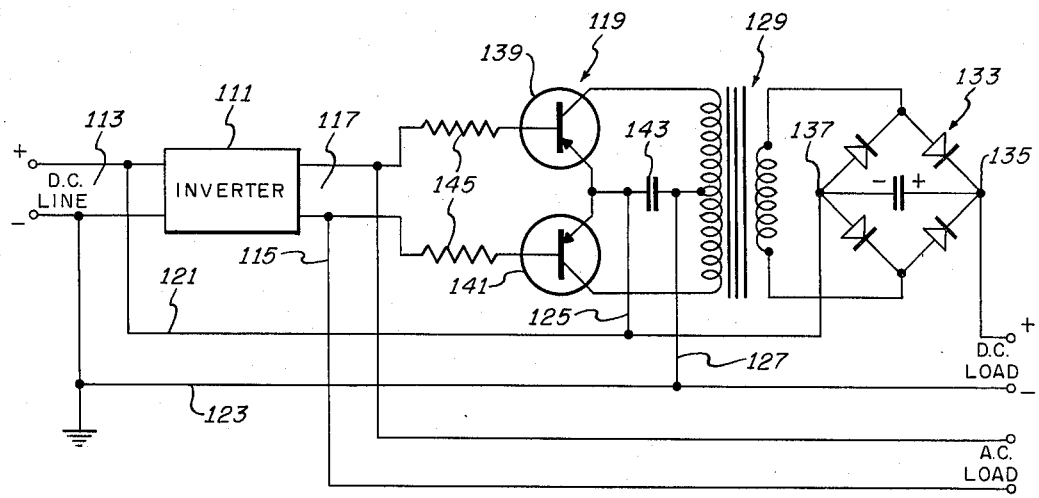

These and other objects and advantages will become apparent upon consideration of the following description when read in conjunction with the accompanying drawings in which:

FIG. 1 is a block diagram of a voltage converter employing the principles of the invention, and FIG. 2 is a schematic diagram, partly in block form, illustrating a specific circuit employing the principles of the invention.

Referring now to FIG. 1, there is shown an inverter 11 energized through a direct current line 13. Although this line is conveniently grounded, the ground connection is not essential to the practice of the invention. Inverters that are capable of producing alternating current output waves when energized from a comparatively low voltage direct current source are well known in the art. The inverter 11 preferably provides a substantially square output wave although other wave shapes can be accommodated. Furthermore, although mechanical or vacuum tube devices might be used for this purpose, transistor inverters are presently preferred because they are compact, efficient, lightweight devices. A transistor inverter suitable for this purpose is disclosed in Patent No. 2,783,384, issued February 26, 1957 to R. L. Bright et al. The principal requirements placed on the inverter 11 are that it must produce a voltage of sufficient magnitude to saturate the amplifier driven by the inverter and that the pulse repetition frequency must be suitable to energize a chosen alternating current load. The reason for these requirements will become manifest as the discussion proceeds.

The inverter 11 is provided with output terminals to which are connected the transmission lines 15 and 17. The transmission line 15 serves to convey the output pulses of the inverter to the alternating current load terminals of the converter. Transmission line 15 may be used to energize a transformer or other impedance changing device if the characteristics of the particular alternating current load are such that the load cannot be directly connected to the inverter.

The transmission line 17 connects the output terminals of the inverter to the signal input terminals of an overdriven amplifier 19. This amplifier is energized directly from the input line 13 by means of the conductors 21 and 23 and the conductors 25 and 27. The output of the over-driven amplifier 19 is fed to an isolation transformer 29 by means of transmission line 31. The isolation transformer 29 serves to couple the alternating current energy from the over-driven amplifier to a bridge rectifier 33 while preventing the flow of direct current between these elements.

Although transformer coupling is presently preferred for this purpose, other coupling means such as networks containing series capacitors may be substituted for the transformer.

The direct voltage from the rectifier 33 appears across the rectifier output terminals 35 and 37. The negative terminal 37 is connected to the positive conductor in line 13 by means of a series conductor 21. The series conductor 21 serves to connect the source of voltage feeding line 13 and the rectifier in a series-aiding relationship. The negative conductor in line 13 is connected to the negative direct current load terminal by means of conductor 23. Thus, the voltage appearing across the direct current load terminals is equal to the sum of the direct current line voltage and the rectifier output voltage.

The energy from the amplifier 19 that is coupled to transformer 29 is derived directly from the line 13 through the conductors 21 and 23 and the conductors 25 and 27 in accordance with the signals from the inverter 11. Thus, the inverter 11 determines whether or not energy is to be coupled to the transformer at any instant, but the energy itself is derived directly from line 13. Substantially none of the energy eventually reaching the direct current load terminals passes through the inverter 11.

The combination of the inverter 11 and the amplifier 19 functions essentially as a switching means serving to permit energy from the line 13 to be applied periodically to the isolation transformer.

Since substantially none of the energy supplied to the direct current load terminals passes through the inverter, this element can be comparatively small and light in weight.

Similarly, only a portion of the energy to be delivered to the direct current load terminals passes through the amplifier and the transformer, so that these components need be only large enough to carry that portion of the total power. The consequent saving in bulk is of prime importance in aircraft applications and the like.

Since the amplifier 19 is driven to saturation, its internal resistance is relatively low. The direct current load thus "looks back" into a low resistance source. The output voltage remains relatively constant despite changes in load current drawn from the source.

Furthermore, the amplifier operating under these conditions effectively isolates the inverter from changes in direct current loading, so that the magnitude of the inverter voltage applied to the alternating current load terminals is relatively independent of the direct current loading.

FIG. 2 illustrates a specific circuit that has been found useful in practicing the invention. An inverter 111 of the type previously described is energized from a direct current line 113. A transmission line 115 conveys output pulses from the inverter to the alternating current load terminals. A signal from the inverter 111 is also supplied to the base elements of the transistors 139 and 141 in an over-driven amplifier 119 through a transmission line 117 and a pair of current limiting resistors 145. Energy from the line 113 is supplied to the amplifier 119 through the conductors 121 and 123 together with conductors 125 and 127. A capacitor 143 serves to store energy between pulses and suppress line transients. Energy from the amplifier 119 is coupled through a transformer 129 to a bridge rectifier 133. The positive output terminal 135 of the bridge rectifier is connected to the positive direct current load terminal. The negative output terminal 137 of the bridge rectifier is connected to the positive side of the input line through the series conductor 121. The negative direct current load terminal is connected to the negative line terminal by means of the conductor 123. Thus, the voltage appearing across the direct current load terminal is equal to the sum of the input line voltage and the bridge output voltage.

To better understand the operation of this embodiment of the invention, consider a typical situation in which a supply of 12 volts is available and it is desired to provide a direct voltage of 24 volts together with an alternating voltage of 12 volts.

The 12 volt input is applied to the inverter through the input line 113. The inverter provides a square wave output of approximately 12 volts peak amplitude at its output terminals. The pulse repetition frequency in the typical circuit was chosen to be 2,000 cycles per second since this was convenient for energizing the signal circuits used in this particular application. It is to be realized, however, that the voltage level of this output can be changed by well known techniques to suit a particular load. Similarly, the pulse repetition frequency can be chosen to be any value within the capabilities of conventional inverter circuits.

A portion of the pulse output of the inverter is also conveyed to the base elements of the transistors 139 and 141. The emitter voltage on the transistors in the example assumed is maintained at the input line voltage of 12 volts by virtue of conductors 121 and 125. The collector voltage is biased at negative line potential by means of the conductors 123 and 127. Under these conditions, the output voltage of the inverter is of sufficient magnitude to completely saturate a transistor on the negative excursions and to substantially cut off a transistor on the positive excursions. Thus, during normal operation, the transistor 139 is switched to a fully conducting state at the same time that the transistor 141 is switched to a substantially cut off condition. One half cycle later, the conditions are reversed and transistor 139 is switched to the cut off condition while the transistor 141 is switched to a saturated condition. When a transistor is driven to saturation, its resistance becomes very low and little power is dissipated in the transistor. Thus, practically all of the energy available from the line and from the capacitor 143 is applied across the portion of the primary winding of the transformer 129 associated with the saturated transistor. A voltage is induced in the secondary winding which in turn energizes the bridge rectifier 133. Since the negative output terminal of the bridge is connected to the positive side of the input line 11, any voltage appearing across the bridge is added to the line voltage.

In the example given for illustration wherein the input voltage is 12 volts, the circuit was designed to produce an additional 12 volts across the bridge terminals. Thus, 24 volts is supplied to the direct current load terminals.

Because the transistors are driven to saturation, their resistance during conduction is low. This presents a low impedance source of voltage to the load. The voltage of this source remains substantially constant as the load is varied.

In a similar fashion, the saturated transistors effectively isolate the inverter from changes in direct current loading.

In addition, the isolation provided by the saturated transistors serves to overcome starting difficulties. It is frequently difficult to start prior art circuits under load since commencement of the oscillations depends upon slight imbalances in the circuit components and these imbalances are affected by the circuit load. By isolating the inverter from the effect of the load, the circuit conditions necessary to start oscillations can be maintained regardless of the load.

While the invention has been described in its preferred embodiments, it is to be understood that the words which have been used are words of description rather than of limitation and that changes within the purview of the appended claims may be made without departing from the true scope and spirit of the invention in its broadest aspects.

What is claimed is:

1. A voltage supply comprising a pair of line terminals, a pair of direct current load terminals, an inverter energized from said line terminals, an over-driven amplifier coupled to receive a portion of the output of said inverter, said amplifier further characterized in that it is driven to saturation by the normal output of said inverter, a bridge rectifier containing a pair of input terminls and a pair of output terminals, coupling means interconnecting the output of said amplifier and the input terminals of said bridge rectifier, conducting means connecting the first of said pair of line terminals to the first of said pair of bridge output terminals, conducting means connecting the second of said pair of bridge output terminals to the first of said pair of direct current load terminals, conducting means interconnecting the second of said line terminals and the second of said direct current load terminals, and a pair of alternating current load terminals connected to receive a portion of the output of said inverter.

2. A voltage converter comprising an inverter having a pair of input and a pair of output terminals, an amplifier, power input terminals on said amplifier electrically connected to the input terminals on said inverter, signal input terminals on said amplifier electrically connected to the output terminals of said inverter whereby the flow of power through said amplifier is controlled by the output of said inverter, said inverter being further characterized in that it provides an output voltage of sufficient magnitude to saturate said amplifier, a rectifier coupled to receive the output of said amplifier, a first conducting means coupled to one of the pair of input terminals on said inverter, a second conducting means interconnecting the second of the pair of input terminals on said inverter and said rectifying means so that the voltage output of the rectifier is added to the line voltage supplied to the device, a pair of direct current load terminals connected to the output of said rectifier and said first conducting means respectively, and a pair of alternating current load terminals connected to the output terminals of said inverter.

3. An electric power converter comprising an inverter, positive and negative line terminals for energizing said inverter from a direct voltage line; first and second inverter output terminals; first and second transistors, each including a base element, a collector element, and an emitter element; conducting means for electrically connecting the first inverter output terminal to the base element of the first transistor and the second inverter output terminal to the base element of the second transistor; said inverter being further characterized in that its output voltage is of sufficient magnitude to saturate said transistors; conducting means connecting the emitter elements of both transistors to the positive line terminal; capacitor means having positive and negative terminals; conducting means connecting the positive terminal of said capacitor to the emitter elements of said transistors;

a transformer having a center-tapped primary winding and a secondary winding; conducting means connecting one end of the primary winding of said transformer to the collector element of said first transistor and the opposite end of the primary winding to the collector element of said second transistor; conducting means connecting the center tap of the primary winding of said transformer to the negative terminal of said capacitor and to the negative line terminal; a bridge rectifier having a pair of input terminals and positive and negative output terminals; conducting means connecting the input terminals of said bridge rectifier across the secondary winding of said transformer; conducting means connecting the negative output terminal of said bridge rectifier to said positive line terminal; positive and negative load terminals; conducting means connecting said positive load terminal to the positive output terminal of said bridge rectifier; conducting means connecting said negative load terminal to said negative line terminal; and alternating current load terminals connected to said first and second inverter output terminals.

4. A voltage converter comprising an inverter constructed and arranged to produce symmetrical alternating current switching signals; positive and negative line input terminals on said inverter; an overdriven amplifier connected to receive alternating current switching signals from said inverter; an isolating transformer to receive energy from said overdriven amplifier; a center-tapped primary winding on said isolating transformer; first and second transistors in said amplifier connected to the first and second ends of said primary winding respectively; coupling means connected between said center tap and said transistors; said inverter being further constructed and arranged to provide an output wave of sufficient magnitude to saturate the first transistor during positive excursions of the alternating current signal and to saturate the second transistor during negative excursions of the alternating current signal; a bridge rectifier connected across the secondary of the isolating transformer; conducting means interconnecting said positive line input terminal and the negative output terminal of said bridge rectifier; and positive and negative load terminals connected to the positive output terminal of the bridge rectifier and the negative line input terminal respectively.

5. A voltage converter comprising an inverter constructed and arranged to provide an alternating current switching signal; positive and negative line input terminals on said inverter; an overdriven amplifier connected to receive alternating current switching signals from said inverter; an isolating transformer to receive energy from said overdriven amplifier; a center-tapped primary winding on said isolating transformer; first and second transistors in said amplifier connected to the first and second ends of said primary winding respectively; coupling means connected between said center tap and said transistors; said inverter being further constructed and arranged to produce an output signal of sufficient magnitude to saturate the first transistor and cut off the second transistor during one half of the alternating current cycle and to saturate the second transistor and cut off the first transistor during the second half of the alternating current cycle; a bridge rectifier connected across the secondary of the isolating transformer; conducting means interconnecting said positive line input terminal and the negative output terminal of said bridge rectifier; and positive and negative load terminals connected to the positive output terminal of the bridge rectifier and said negative line input terminal respectively.

6. In combination, an inverter constructed and arranged to produce a square wave alternating current switching signal; positive and negative line input terminals on said inverter; a pair of output terminals on said inverter; first and second PNP transistors having their base electrodes coupled to the first and second of said pair of inverter output terminals respectively; both transistors further having their emitter electrodes connected to said positive line input terminal; an isolation transformer; a center-tapped primary winding on said transformer; conducting means interconnecting said negative line input terminal and the center tap of said transformer winding; said primary winding further having its opposite ends connected to the collector electrodes of said first and second transistors respectively; said inverter being further constructed and arranged to produce an output signal of sufficient magnitude to saturate a transistor whenever the output terminal to which the transistor is connected is negative and to completely cut off a transistor whenever the output terminal to which the transistor is connected is positive; a full wave bridge rectifier coupled to the output of said transformer; a negative output terminal on said rectifier connected to said positive line input terminal; and positive and negative direct current load terminals connected to the positive output terminal of said bridge rectifier and the negative line input terminal respectively.

References Cited by the Examiner

UNITED STATES PATENTS

| 2,330,500 | 9/1943 | Leifer | 321—2 |
| 3,064,177 | 11/1962 | Bender | 321—2 |

LLOYD McCOLLUM, *Primary Examiner.*